United States Patent
Shimokawa et al.

(10) Patent No.: US 7,210,443 B2
(45) Date of Patent: May 1, 2007

(54) ENGINE STOPPAGE NOTIFICATION APPARATUS

(75) Inventors: Tomoo Shimokawa, Utsunomiya (JP); Satoshi Chida, Utsunomiya (JP); Kazuhito Tokugawa, Utsunomiya (JP); Shinichi Ishikawa, Utsunomiya (JP)

(73) Assignee: Keihin Corporation, Tokyo (JP)

( * ) Notice: Subject to any disclaimer, the term of this patent is extended or adjusted under 35 U.S.C. 154(b) by 105 days.

(21) Appl. No.: 11/071,336

(22) Filed: Mar. 4, 2005

(65) Prior Publication Data

US 2005/0199209 A1    Sep. 15, 2005

(30) Foreign Application Priority Data

Mar. 9, 2004    (JP)    ............ P 2004-065850

(51) Int. Cl.
*F02N 17/00*    (2006.01)
(52) U.S. Cl. .................................. 123/179.4
(58) Field of Classification Search ............ 123/179.4, 123/198 DB, 198 DC
See application file for complete search history.

(56) References Cited

U.S. PATENT DOCUMENTS 6,739,418 B2 *    5/2004    Ogata et al. ............... 180/65.2

FOREIGN PATENT DOCUMENTS

JP    58162743 A *    9/1983

* cited by examiner

*Primary Examiner*—Stephen K. Cronin
*Assistant Examiner*—Arnold Castro
(74) *Attorney, Agent, or Firm*—Squire, Sanders & Dempsey L.L.P.

(57) ABSTRACT

The present invention provides an engine stoppage notification apparatus with which, due to its compatibility with and good correspondence to the intention of a driver to start off a vehicle and to stop and idle the vehicle, it is possible to anticipate the possibility of enhancement of product quality along with alleviation of the burden upon the driver. This engine stoppage notification apparatus notifies the driver that the engine is about to stop when the engine has satisfied certain predetermined stoppage permission conditions, and includes a notification device which, from when the stoppage permission conditions are satisfied until the engine stops, issues a notification of the engine stoppage.

5 Claims, 6 Drawing Sheets

ENGINE STOPPAGE NOTIFICATION APPARATUS

BACKGROUND OF THE INVENTION

1. Field of the Invention

The present invention relates to an engine stoppage notification apparatus.

Priority is claimed on Japanese Patent Application No. 2004-065850, filed Mar. 9, 2004, the content of which is incorporated herein by reference.

2. Description of Related Art

From the prior art, in a vehicle such as, for example, an automobile or a motorcycle or a scooter, in order to minimize the amount of exhaust gas which is emitted and the consumption of fuel, there have per se been known devices which stop the engine when the vehicle has ceased to move and the engine is idling, as when waiting at a traffic signal or during an episode of road congestion or the like, and which restart the engine from this idling stoppage state when the driver actuates the accelerator or releases the brake. A notification device is provided which notifies the driver of this engine stoppage during the idling stoppage state, and which thus also reassures the driver that this engine stoppage is not a malfunction (for example, refer to Japanese Patent Application, First Publication No. 2000-283010).

However, since the idling stoppage is performed provided that the idling stoppage conditions are fulfilled, even if, when for example waiting at a traffic signal or the like, it is clear to the driver of the vehicle that the signal will soon go to green, accordingly the intention of the driver to start off the vehicle and the timing of implementation of the idling stoppage may not correspond to one another and be mutually compatible, and there has been the problem that this imposes an undue burden upon the driver of the vehicle.

Furthermore if, even though the idling stoppage conditions are satisfied, the accelerator is again actuated for a second time during the time period from when the operation of the injector or injectors, and/or of the ignition, has been stopped in order to stop the engine to when the engine actually stops, then the problems occur that a burden of acceleration is imposed upon the engine which must restart again, and moreover a sense of discomfort is engendered in the driver, so that the product quality is deteriorated.

Thus, the objective of the present invention is to propose an engine stoppage notification apparatus, which is capable of alleviating the burden upon the driver of the vehicle by ensuring that the intention of the driver to start off the vehicle and the idling stoppage state correspond to one another and are mutually compatible, so that it is possible to anticipate enhancement of the product quality.

SUMMARY OF THE INVENTION

The present invention proposes an engine stoppage notification apparatus which is fitted to a vehicle including an engine, and which stops the engine when predetermined stoppage permission conditions are satisfied and starts the engine when predetermined restart permission conditions are satisfied, including a notification device which, from when the stoppage permission conditions are satisfied until the engine stops, issues a notification of the engine stoppage.

Since, according to the present invention as described above, the notification of the engine stoppage is provided from when the stoppage permission conditions for the engine are satisfied until the engine actually stops, accordingly it is possible for the driver to be aware of the engine stoppage in advance, and it is possible for him to make preparations for the engine stoppage. Therefore, it is possible to alleviate the burden upon the driver of the vehicle.

According to another aspect thereof, the present invention proposes an engine stoppage notification apparatus which is fitted to a vehicle including an engine, and which stops the engine when predetermined stoppage permission conditions are satisfied and starts the engine when predetermined restart permission conditions are satisfied, including: a sensor which detects the operational state of the vehicle; a stop permission determination device which determines whether or not the engine stoppage is permitted, based upon the detection signal from the sensor; a measurement device which measures a predetermined time period from the time point at which the stop permission determination device has determined that the engine stoppage is permitted; and a notification device which issues a notification of the engine stoppage, while the measurement device is measuring the predetermined time period.

According to the present invention as described above, the operational state of the vehicle is detected, and, based upon the result of this detection, a decision is made as to whether or not to permit the engine stoppage; and, if the operational state is such that the engine may be stopped, engine stoppage is permitted, the predetermined time period is measured from the time that the engine stoppage has thus been permitted, and after this predetermined time period has elapsed the engine is stopped. Since the notification of the engine stoppage is issued during the measurement of this predetermined time period, accordingly the driver is made aware of the engine stoppage in advance, so that he is able to make preparations for the engine stoppage. Therefore, it is possible to alleviate the burden upon the driver of the vehicle.

With the engine stoppage notification apparatus of the present invention, it is desirable for, after the engine has stopped, restarting of the engine to be prohibited while the predetermined time period is elapsing, irrespective of the presence or absence of the restart permission.

Since, according to the present invention as described above, restarting of the engine is not permitted until the predetermined time period has elapsed and the engine has completely stopped, accordingly it is possible to prevent imposition of a burden upon the engine due to restarting before it has completely stopped. Therefore, it is possible to enhance the product quality.

With the engine stoppage notification apparatus of the present invention, it is desirable for the notification device to be a display device which informs that the engine stoppage is imminent, from when the stoppage permission conditions are satisfied until the engine stops.

Since, according to the present invention as described above, the fact that the engine stoppage is imminent is displayed, accordingly it is possible for the driver of the vehicle to be visually aware that the engine stoppage is imminent. Therefore, it is possible further to alleviate the burden upon the driver of the vehicle.

Moreover, with the engine stoppage notification apparatus of the present invention, it is desirable for there to be further included a stoppage cancellation device which, from when the stoppage permission conditions are satisfied until the engine stops, is capable of cancellation of the engine stoppage.

According to the present invention as described above, if, even though the engine is stopped, it is clear to the driver of the vehicle that it will soon be required to restart it, such as for example when the vehicle is waiting at a signal or the like and it appears that the signal will shortly change to green, then it is possible for the driver of the vehicle to cancel the engine stoppage at any time without any sense of discomfort, even though the notification of the engine stoppage is being provided. Therefore, along with it being possible further to alleviate the burden upon the driver of the vehicle, it is also possible to further enhance the product quality.

DETAILED DESCRIPTION OF THE INVENTION

In the following, the first preferred embodiment of the present invention will be described with reference to the drawings.

Figure 1:
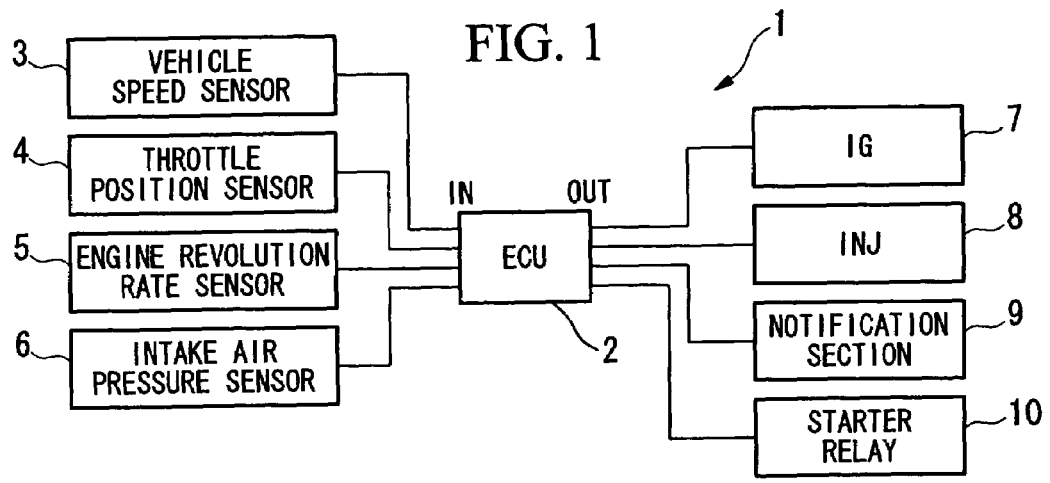
FIG. 1 is a block diagram of an engine stoppage notification apparatus according to the first preferred embodiment of the present invention.

In FIG. 1, there is shown an engine stoppage notification apparatus 1 for a powered two wheel vehicle such as a scooter or the like. When stoppage permission conditions are satisfied and moreover the idling state is continuing, idling stoppage (hereinafter termed engine stoppage) is performed in which the engine ignition and fuel injection for the engine of this powered two wheel vehicle are stopped; and, when restart permission conditions such as for example accelerator actuation or the like are satisfied, the engine is restarted.

In this engine stoppage notification apparatus 1, there is included a control device (an ECU) 2 which performs various types of control processing for the engine, a vehicle speed (V) sensor 3, a throttle (TH) position sensor 4, an revolution rate (NE) sensor 5, an intake air pressure sensor 6 and the like are connected to the input (IN) side of the control device 2. The detected vehicle speed signal from the vehicle speed sensor 3 is inputted to the control device 2. The control device 2 makes a decision as to whether or not this powered two wheel vehicle is stopped, based upon this detected vehicle speed signal from the vehicle speed sensor 3.

The detected throttle position signal from the throttle position sensor 4 is inputted to the control device 2. The control device 2 detects the intention on the part of the driver to start off the vehicle based upon the result which is detected by this throttle position sensor 4. In concrete terms, it detects whether or not the driver of this powered two wheel vehicle is performing accelerator actuation, based upon the detected throttle position signal from the throttle position sensor 4.

The detected revolution rate signal from the revolution rate sensor 5 is inputted to the control device 2. The control device 2 makes a decision as to whether or not the engine has been completely stopped (the revolution of the crank shaft has stopped). Furthermore, the negative pressure in the intake manifold which has been detected by the intake air pressure sensor 6 is inputted to the control device 2. The control device 2 combines the result which is detected by the intake air pressure sensor 6 and the result which is detected by the throttle position sensor 4, and makes an accurate decision as to the presence or absence of accelerator actuation by the driver of the vehicle.

The control device 2 is endowed with the function of acting as a stoppage permission determination device which, based upon the signals detected by the various sensors, decides whether or not the engine stoppage is permitted, and with the function of acting as a measurement device which measures a predetermined time period from the time point at which this stop permission determination device has permitted the engine stoppage. Furthermore, the control device 2 is endowed with the function of acting as a stoppage device which stops the engine after that predetermined time period has elapsed, and with the function of acting as a stoppage cancellation device which, from when the stoppage permission conditions are satisfied until the engine actually stops, is capable of canceling the engine stoppage.

The ignition (IG) 7, an injector (INJ) 8, a notification section (notification device) 9, and a starter relay 10 are connected to the output (OUT) side of the control device 2. The ignition 7 generates pulses for ignition of the engine, and supplies a voltage to an ignition plug which is fitted to the cylinder head of the engine. The injector 8 injects fuel to, for example, the combustion chamber or the intake manifold of the engine. The amount of the fuel which is injected from the injector 8 to the combustion chamber in this manner, and the timing of its injection, are controlled by the control device 2.

The notification section 9 is a display device such as a lamp or the like, and is mounted to a meter panel upon which the speedometer of the vehicle and other display devices are fitted. This notification section 9 notifies the driver that the engine stoppage is imminent. In concrete terms, if for example the engine stops after ten seconds from when the stoppage permission conditions are satisfied, the notification section 9 may stimulate the attention of the driver by blinking from five seconds before the engine stops until the engine actually stops.

It should be understood that the notification section 9 may be located in any position, provided that its visibility is good; for example, it would also be acceptable to provide it upon a shield or the like in front of the meter panel.

The starter relay 10 is for putting into motion the starter motor which starts the vehicle. The opening and closing of the contacts of this starter relay 10 is controlled by the control device 2.

In the following, the engine stoppage procedure which is executed by this first preferred embodiment of the present invention will be explained based upon the flow charts shown in FIGS. 2 through 5, and upon the timing chart shown in FIG. 6.

First, the engine stoppage procedure until the engine stoppage conditions are satisfied will be explained.

In step S100, a decision is made as to whether or not the engine stoppage procedure has been completed. If the result of the decision in step S100 is NO (in other words, the engine stoppage procedure has not been completed), then the flow of control proceeds to step S101; while, if the result of this decision is YES (in other words, the engine stoppage procedure has been completed), then the flow of control proceeds to step S115.

Figure 4:
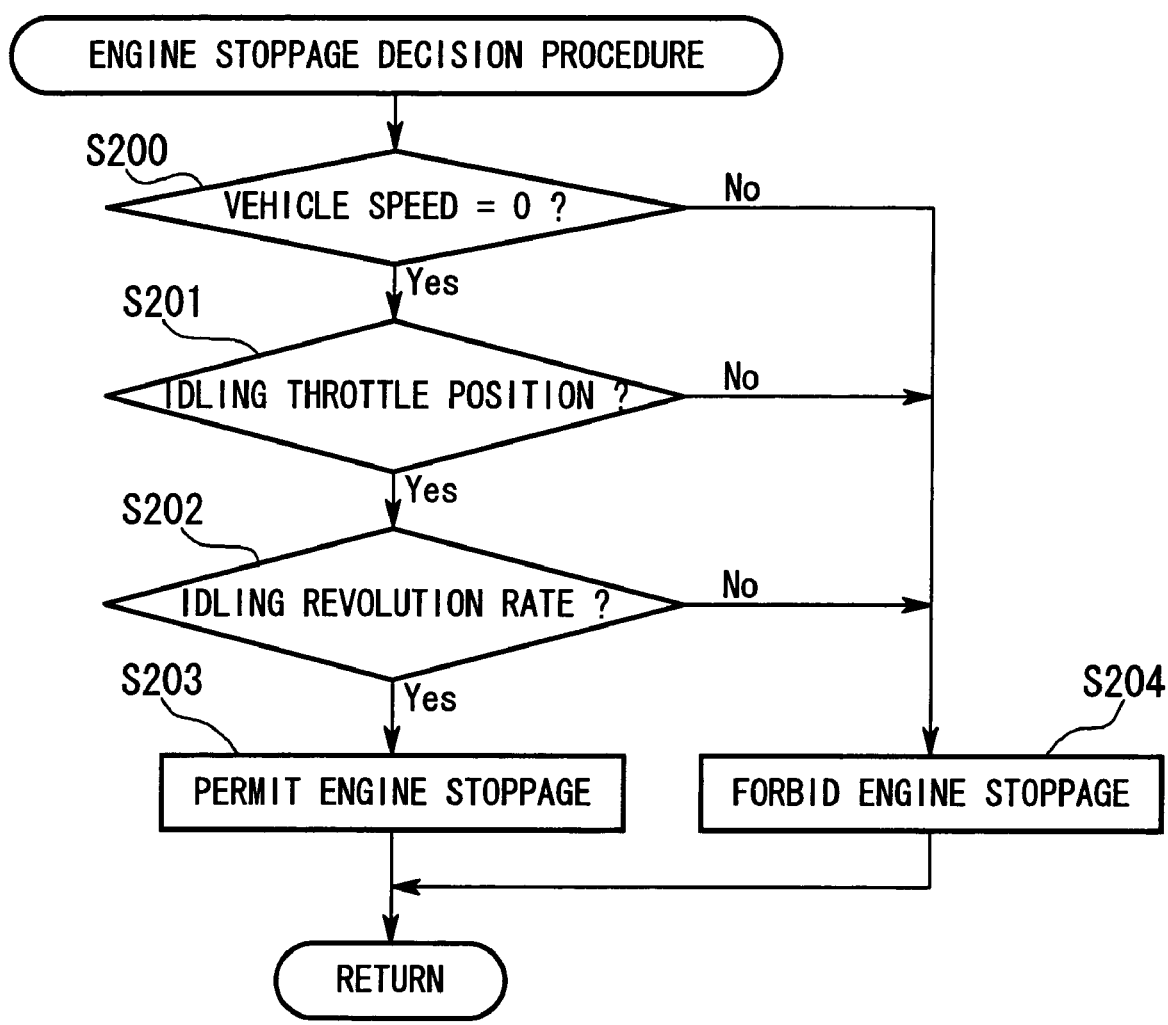
FIG. 4 is a flow chart of an engine stoppage decision procedure which is performed by the engine stoppage notification apparatus according to the first preferred embodiment of the present invention.

In step S101, an engine stoppage decision procedure shown in FIG. 4 is performed.

As shown in FIG. 4, in step S200, a decision is made as to whether or not the vehicle speed is zero. If the result of the decision in step S200 is YES (in other words, the vehicle speed is zero), then the flow of control proceeds to step S201; while, if the result of this decision is NO (in other words, the vehicle speed is not zero), then the flow of control proceeds to step S204, in which the engine stoppage is set to "not permitted" and the flow of control returns.

In step S201, a decision is made as to whether or not the throttle (TH) position is the idling position. If the result of the decision in step S201 is YES (in other words, the throttle position is the idling position), then the flow of control proceeds to step S202; while, if the result of this decision is NO (in other words, the throttle position is not the idling position), then the flow of control again proceeds to step S204, in which, the engine stoppage is set to "not permitted" and the flow of control returns.

In step S202, a decision is made as to whether or not the revolution rate is the idling revolution rate. If the result of the decision in step S202 is YES (in other words, the revolution rate is the idling revolution rate), then the flow of control proceeds to step S203, in which the engine stoppage is permitted and the flow of control returns. On the other hand, if the result of this decision is NO (in other words, the revolution rate is not the idling revolution rate), then the flow of control again proceeds to step S204, in which, again, the engine stoppage is set to "not permitted" and the flow of control returns.

Figure 2:
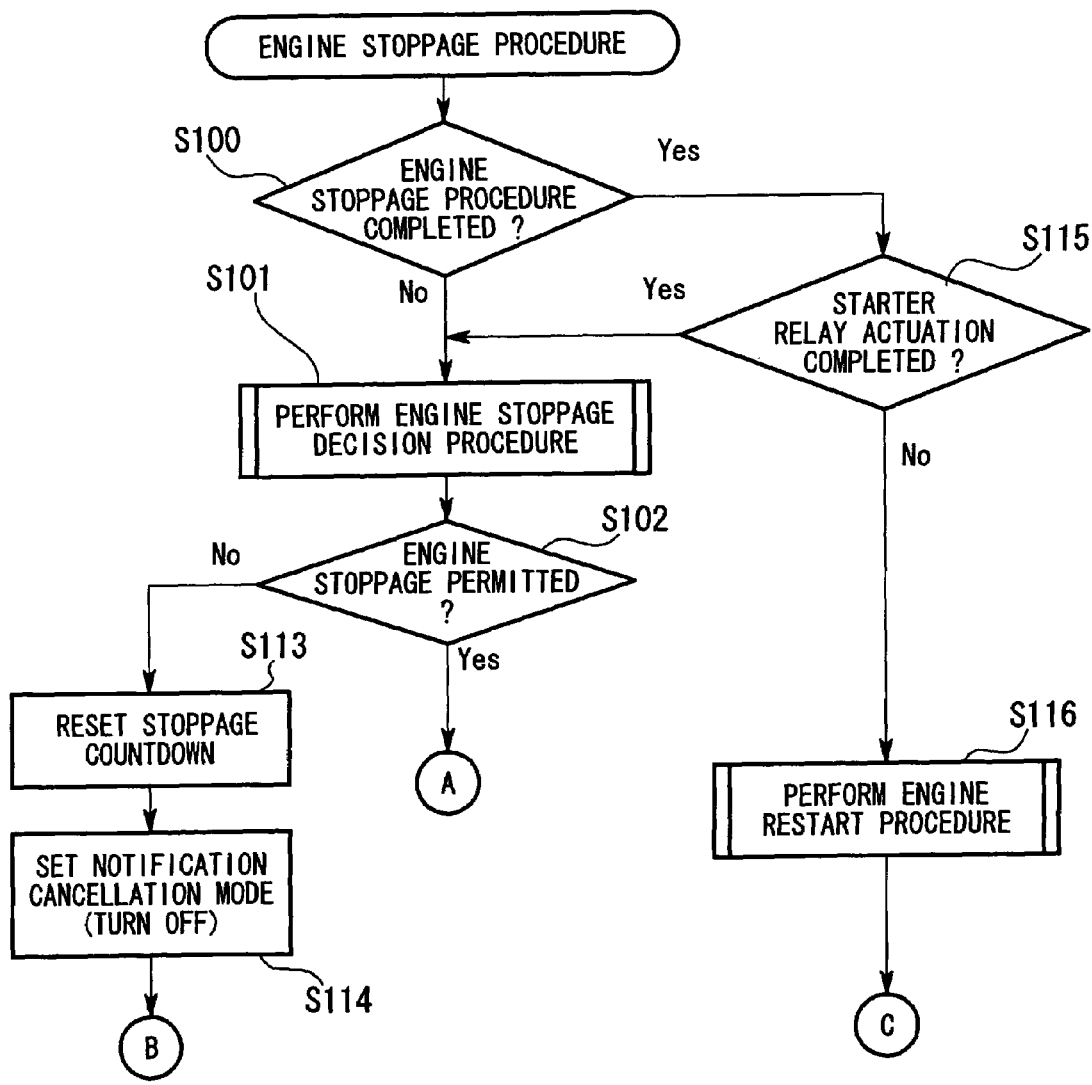
FIG. 2 is a flow chart of an engine stoppage procedure which is performed by the engine stoppage notification apparatus according to the first preferred embodiment of the present invention.

Next, as shown in FIG. 2, in step S102, a decision is made as to whether or not the engine stoppage is permitted. If the result of the decision is NO (in other words, if the engine stoppage is not permitted), then the flow of control proceeds to step S113; while, if the result of this decision is YES (in other words, the engine stoppage is permitted), then the flow of control proceeds to step S103 shown in FIG. 3.

In step S113, a stoppage countdown is reset—in concrete terms, the value of a stoppage timer which performs this countdown is set to, for example, ten seconds—and then the flow of control proceeds to step S114.

Figure 3:
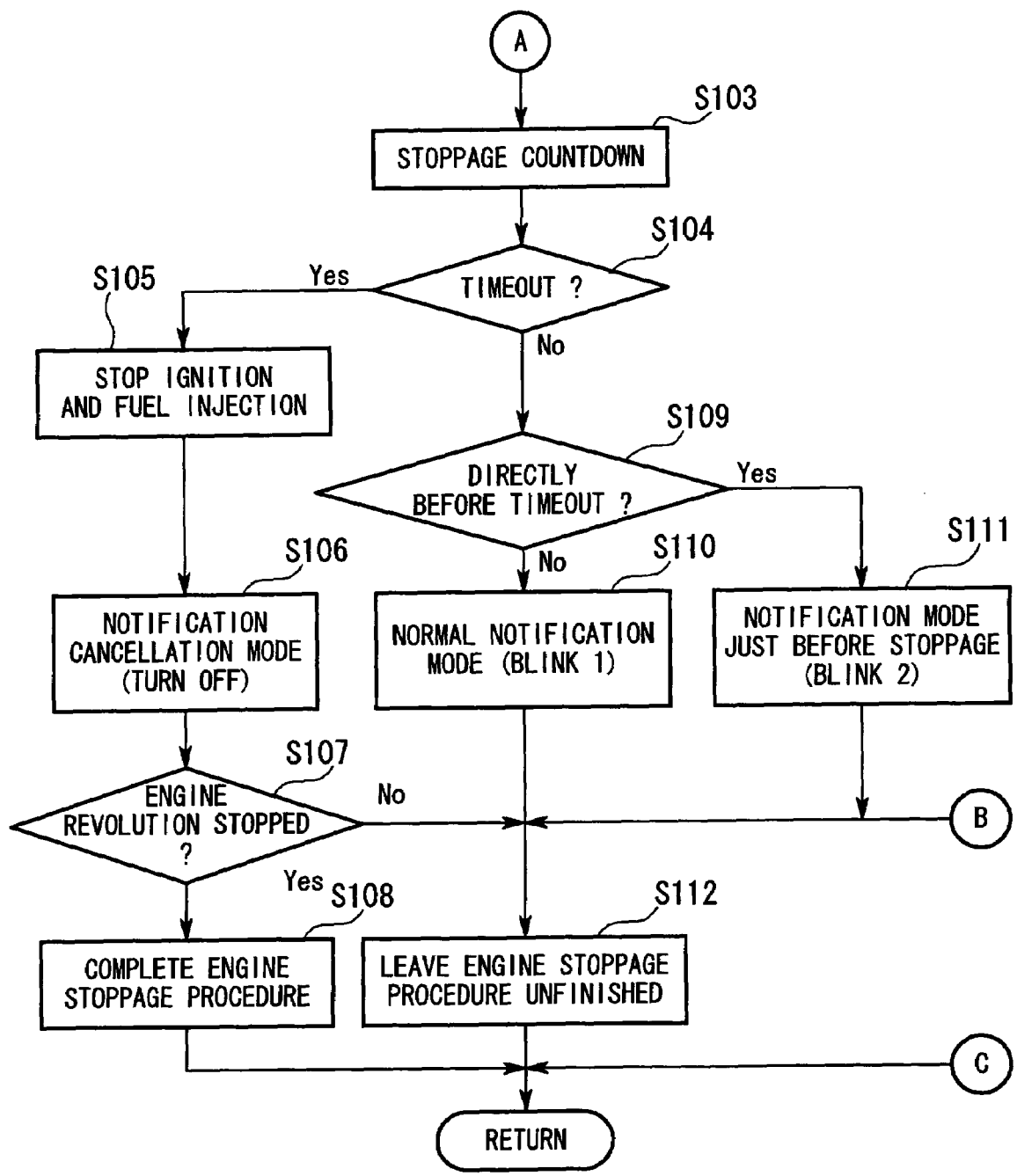
FIG. 3 is another flow chart of an engine stoppage procedure which is performed by the engine stoppage notification apparatus according to the first preferred embodiment of the present invention.

In step S114, the notification section 9 is set to a notification cancellation mode (for example, it is turned off so as not to provide illumination), and then the flow of control proceeds to step S112 shown in FIG. 3. In step S112, the engine stoppage procedure is left unfinished—in other words, completion of the engine stoppage procedure is cancelled—and then the flow of control returns.

Figure 6:
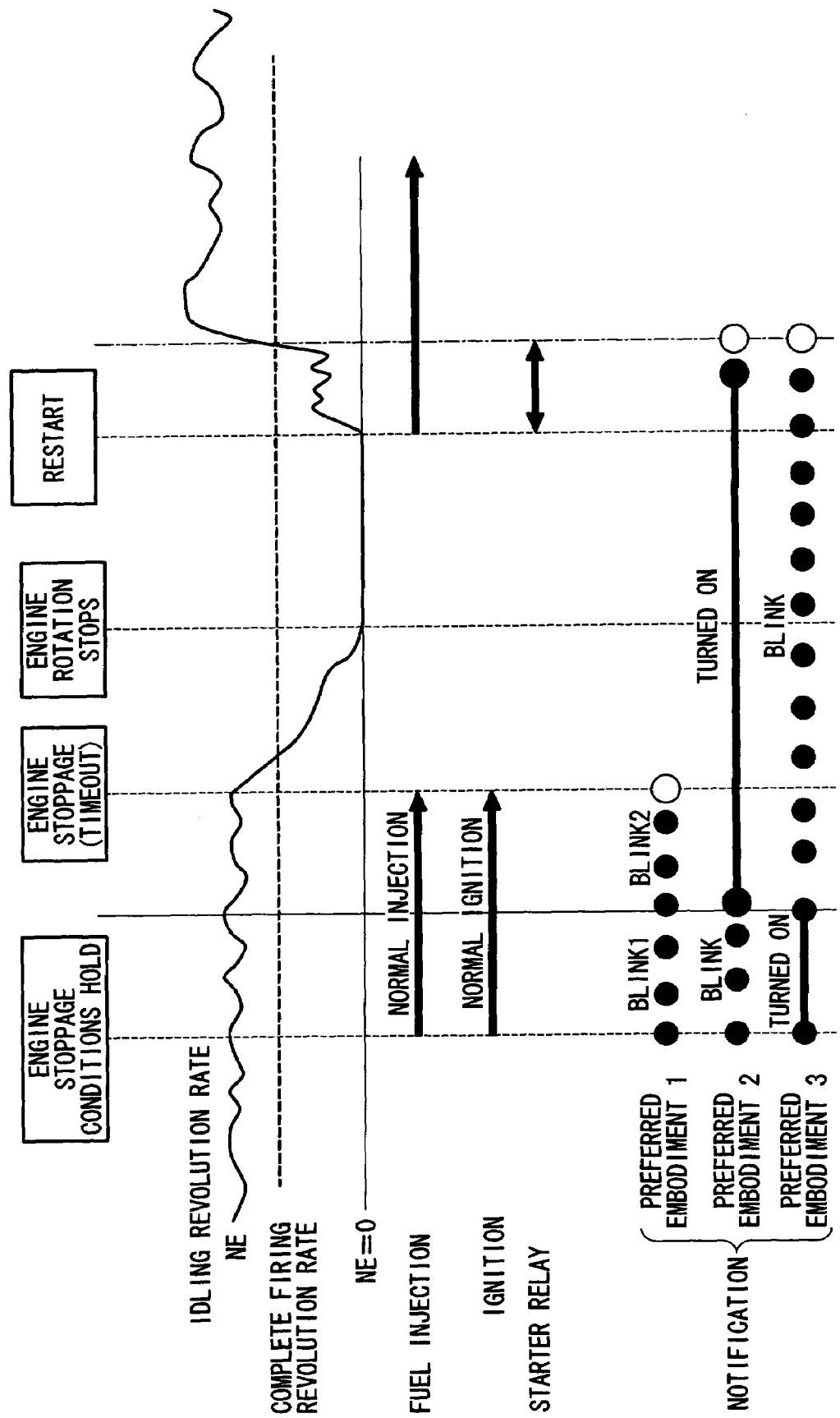
FIG. 6 is a timing chart of engine stoppage as performed by the engine stoppage notification apparatus according to the first preferred embodiment of the present invention.

In other words, the above described procedures are repeated until the engine stoppage conditions hold (the engine stoppage conditions holding time point shown in FIG. 6).

When the engine stoppage is permitted in the above described step S102, the flow of control proceeds to step S103 shown in FIG. 3. In step S103 the stoppage countdown is performed, in other words the value which has been set in the stoppage timer is decremented, and then the flow of control proceeds to step S104. In step S104, a decision is made as to whether or not the countdown has timed out. If the result of the decision is NO (in other words, the stoppage timer has not timed out), then the flow of control proceeds to step S109; while, if the result of this decision is YES (in other words, the stoppage timer has timed out), then the flow of control proceeds to step S105.

Next, in step S109, a decision is made as to whether or not the countdown is directly before timeout (for example, five seconds). If the result of the decision in step S109 is NO (in other words, it is not directly before timeout), then the flow of control proceeds to step S110; while, if the result of this decision is YES (in other words, it is directly before timeout), then the flow of control proceeds to step S111.

In step S110, the notification section 9 is set to a normal notification mode (for example, "blink 1" in the first preferred notification embodiment shown in FIG. 6). On the other hand, in step S111, the notification section 9 is set to a directly before stoppage notification mode (for example, "blink 2" in the first preferred notification embodiment in FIG. 6). In step S112, as previously described, the flow of control returns with the engine stoppage procedure left unfinished.

In other words, as shown in FIG. 6, from the time point that the engine stoppage conditions hold to the timeout time point, the notification section 9 shifts from the normal notification mode to the directly before stoppage notification mode, so that the driver is made aware that the engine will stop thereafter. The driver is able to cancel the engine stoppage at any time point until the timeout time point is arrived at. In concrete terms, if the driver intermittently moves the throttle grip, which is the accelerator, then, in the engine stoppage decision procedure subsequent to step S101, it is decided in step S102 that engine stoppage is not permitted, and the stoppage countdown is reset in step S113, so that in step S114 the notification section 9 is set to the notification cancellation mode, and the engine stoppage procedure is cancelled in step S112.

It should be understood that, apart from the throttle grip, it would also be acceptable to provide a dedicated switch for engine stoppage cancellation, so as to arrange for the engine stoppage to be cancelled by input from this dedicated cancellation switch.

When in the previously described step S104 it has been detected that the countdown has timed out, then the flow of control proceeds to step S105. In step S105, fuel injection via the injector 8 and ignition via the ignition pulse output are stopped. In step S106 the notification section 9 is set to the notification cancellation mode (for example, is turned off), and then the flow of control proceeds to step S107.

Since the time period from the timeout in step S104 to the time point at which the fuel injection via the injector 8 and the ignition via the pulse output by the ignition 7 are stopped in step S105 is an extremely short time period, accordingly, in the timing chart of FIG. 6 which will be described hereinafter, the instant of engine stoppage and the instant of timeout are shown as being the same time instant.

Next, in step S107, a decision is made as to whether or not the engine revolution has stopped. If the result of the decision in step S107 is NO (in other words, the engine revolution has not stopped), then the flow of control proceeds to step S112; while, if the result of this decision is YES (in other words, the engine revolution has stopped), then the flow of control proceeds to step S108.

It should be understood that, although it is shown in step S106 that the notification cancellation mode (turned off) is set, it would also be acceptable for the notification section 9 to be turned, or blinked, provided that it is possible to recognize that this indicates engine stoppage (timeout).

In step S112, as described above, engine stoppage procedure unfinished is set, and the flow of control returns. On the other hand, in step S108, engine stoppage procedure completed is set, and, the flow of control returns.

In other words, while in step S107 it is decided that the engine is not stopped, the ignition and fuel injection stoppage in step S105 are maintained; while, when in step S107 it is decided that the engine has stopped, then the flow of control proceeds to an engine restart procedure which will be described hereinafter, and here ignition and fuel injection are permitted.

In the previously described step S100, if it is decided that the engine stoppage procedure is completed, then the flow of control proceeds to step S115. In step S115, a decision is made as to whether or not the actuation of the starter relay has been completed. If the result of the decision in step S115 is NO (in other words, the actuation of the starter relay has not been completed), then the flow of control proceeds to step S116; while, if the result of this decision is YES (in other words, the actuation of the starter relay has been completed), then the flow of control proceeds to step S101, and the previously described engine stoppage decision procedure is repeated. In step S116, an engine restart procedure whose flow chart is shown in FIG. 5 is performed, and then the flow of control returns.

It should be understood that the notification mode of "blink 1" in step S110 and the notification mode of "blink 2" in step S111 are not to be considered as being limitative; provided that these two states can be distinguished from one another by the driver, any arrangement will be acceptable— for example, this notification may be performed according to whether the light is strongly or weakly illuminated. Furthermore, the notification cancelled mode of step S114 is not limited to being shown by the light being turned off; it may alternatively be turned, or blinked.

Figure 5:
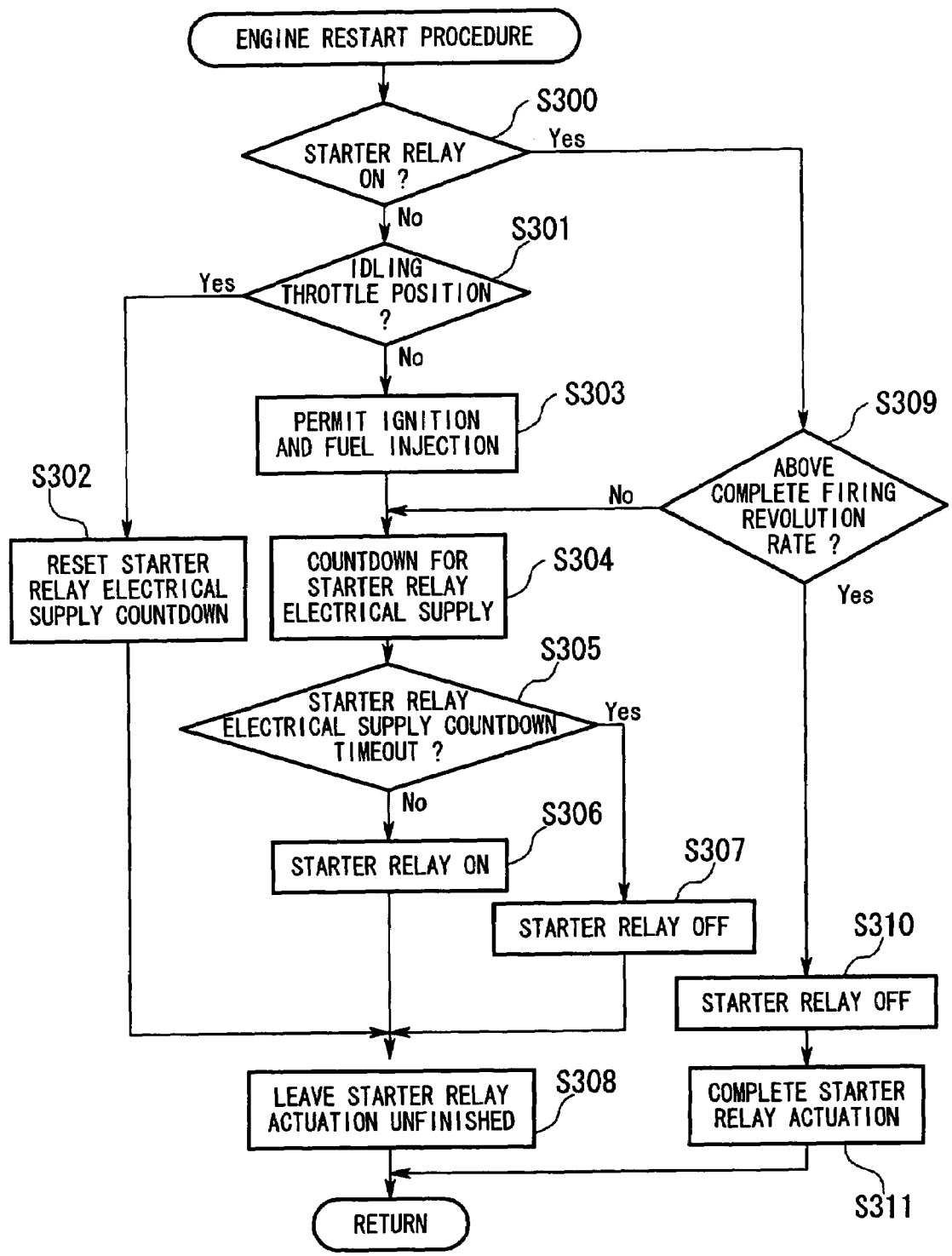
FIG. 5 is a flow chart of an engine restart procedure which is performed by the engine stoppage notification apparatus according to the first preferred embodiment of the present invention.

Next, as shown in FIG. 5, in step S300 of the engine restart procedure, a decision is made as to whether or not the starter relay is ON. If the result of the decision in step S300 is NO (in other words, the starter relay is not ON), then the flow of control proceeds to step S301; while, if the result of this decision is YES (in other words, the starter relay is ON), then the flow of control proceeds to step S309.

Next, in step S301, a decision is made as to whether or not the throttle position is the idling position. If the result of the decision in step S301 is YES (in other words, the throttle position is the idling position), then the flow of control proceeds to step S302; while, if the result of this decision is NO (in other words, the throttle position is not the idling position), then the flow of control proceeds to step S303.

In step S302, the countdown for supplying electrical current to the starter relay 10 is reset. In other words, in step S302, an initial value is set as the set value of the time which protects the starter relay 10.

In step S308, the non-completion of actuation of the starter relay is established, and then the flow of control returns.

After the previously described engine stoppage procedure completion in step S108 has been established, when the driver of the vehicle temporarily actuates the throttle grip, which is the accelerator of the vehicle, in step S301 it is determined that the throttle position is not the idling position, and the flow of control proceeds to step S303. In step S303, ignition and fuel injection are permitted, and then in the subsequent step S304 a countdown is performed for electrical supply to the starter relay 10, and then the flow of control proceeds to step S305.

In step S305, a decision is made as to whether or not the countdown for supply of electrical current to the starter relay 10 has timed out. If the result of the decision in step S305 is NO (in other words, the countdown has not timed out), then the flow of control proceeds to step S306; while, if the result of this decision is YES (in other words, the countdown has timed out), then the flow of control proceeds to step S307. In step S306, the starter relay 10 is turned ON, and then in step S308 the non completion of the actuation of the starter relay 10 is established, and the flow of control returns. On the other hand, in step S307, the starter relay 10 is turned OFF, and then the flow of control returns via the above described procedure.

Next, since in step S306 described previously the starter relay 10 is turned ON, it is determined in step S300 that the starter relay 10 is ON, and the flow of control proceeds to step S309. In step S309, a decision is made as to whether or not the engine speed is above the complete firing revolution rate. If the result of the decision in step S309 is YES (in other words, the engine speed is above the complete firing revolution rate), then the flow of control proceeds to step S310; while, if the result of this decision is NO (in other words, the engine speed is below the complete firing revolution rate), then the flow of control proceeds to step S304 and the above described procedure is repeated.

Here, by the complete firing revolution rate is meant the lower limit for revolution rate at which it is possible for the engine to restart its own revolution without aid from the starter motor.

In step S310 the starter relay 10 is turned off, since it is taken that the engine has started because its engine speed is above the complete firing revolution rate. In next step S311 the completion of actuation of the starter relay 10 is established and the flow of control returns. By the engine stoppage decision procedure of the previously described FIG. 4 flow chart, the engine stoppage becomes non-permitted, and the procedures before the engine stoppage conditions being satisfied are again repeated.

Accordingly, as shown in FIG. 6, when for example the vehicle is waiting at a traffic signal and is stopped, engine stoppage is permitted and the stoppage timer starts to count down from the time point at which the engine stoppage conditions are satisfied, and the notification section 9, which up until this time point has been turned off, starts to blink, as for example in the first preferred notification embodiment (in step S110). Here, as in the first preferred notification embodiment of FIG. 6, it would also be possible to establish the settings so as reliably to perform notification of the timeout to the driver of the vehicle by, for example, increasing the speed (in step S111).

Both the fuel injection by the injector 8 and the pulse output by the ignition 7 are performed normally until the time point at which the stoppage timer times out (in step S104), but, when that timeout time point arrives, both the fuel injection by the injector 8 and the pulse output by the ignition 7 are turned OFF (in step S105). The blinking of the notification section 9 is turned off (in step S111) until the timeout time point arrives. Here, during the interval from the timeout time point until the next time point, at which the revolution of the engine stops, the fuel injection by the injector 8 and the ignition by the pulse output of the ignition 7 are kept in the stopped state.

At the above described timeout time point when the fuel injection by the injector 8 and the ignition by the pulse output of the ignition 7 are stopped, the engine speed is gradually reduced, and, at the engine revolution stoppage time point, the engine speed has reliably reached zero. After this, the fuel injection by the injector 8 and the ignition by the pulse output of the ignition 7 are permitted (in step S303).

At the restart time point such as when the signal goes to green or the like, the driver actuates the throttle grip which is the accelerator of this vehicle, since the throttle position becomes greater than the idling position, the engine stoppage permission shifts to engine stoppage non permission (in step S101), the starter relay 10 goes to ON (in step S306), and, at the same time as the cranking of the engine (in FIG. 5, from the restart time point until the single dashed broken line), the fuel injection by the injector 8 and the pulse output of the ignition 7 are restarted, and the revolution rate rises above the complete firing revolution rate. The starter relay 10 goes to OFF, and the engine restarts and returns from the engine revolution stopped state.

Accordingly, with this first preferred embodiment, when the vehicle speed becomes zero due to waiting at a signal or the like, and also it is detected that the throttle position is equal to the idling position and moreover that the revolution rate is equal to the idling revolution rate, then automatic stoppage of the engine is permitted. Furthermore, when it is detected that the revolution rate has become zero but that the throttle position is not equal to the idling position, then the fuel injection by the injector 8 and the pulse output of the ignition 7 are permitted. Furthermore, when it is determined in step S102 that engine stoppage is permitted, along with performing the countdown from the time point that the engine stoppage conditions are satisfied, this engine stoppage is notified during this countdown by the notification section 9. Therefore, the driver of the vehicle is able to become aware of the engine stoppage in advance, and, since accordingly he is able to make preparations for the stopping of the engine, accordingly it is possible to alleviate the burden upon the driver.

During the time interval from when the fuel injection by the injector 8 and the ignition by the pulse output of the ignition 7 are stopped in step S105, until when the engine speed is completely stopped, irrespective of whether engine stoppage is permitted or is not permitted in steps S203 and S204, the starter relay 10 does not go ON until the fuel injection by the injector 8 and the ignition by the pulse output of the ignition 7 are permitted in step S303. Since accordingly it is possible to prevent imposition of a burden upon the engine due to it being restarted before it has completely stopped. Therefore, it is possible to enhance the product quality.

Furthermore since, as shown in FIG. 6, the driver of the vehicle is able to become aware of the fact that the engine stoppage is imminent due to the notification section 9 shifting from "blink 1" to "blink 2" during the time interval from when the engine stoppage conditions are satisfied until the timeout, accordingly it is possible further to alleviate the burden upon the driver.

Since, during the interval from when the engine stoppage permission has been determined in step S102 until the operation of the injector 8 and of the ignition 7 have actually stopped, it is possible for input from the driver for canceling the engine stoppage to be received, accordingly it is possible to alleviate the burden upon the driver, and it is also possible to enhance the product quality. For example, if although the vehicle is stopped at a signal and waiting, it is clear that the signal will soon change to green, then even if the engine stops it will be necessary for it to restart immediately. Thus, the driver is able to perform the action of cancellation of the engine stoppage simply and easily, merely by actuating the throttle grip intermittently in consideration of the visual information which is provided to him by the notification section 9.

Figure 7:
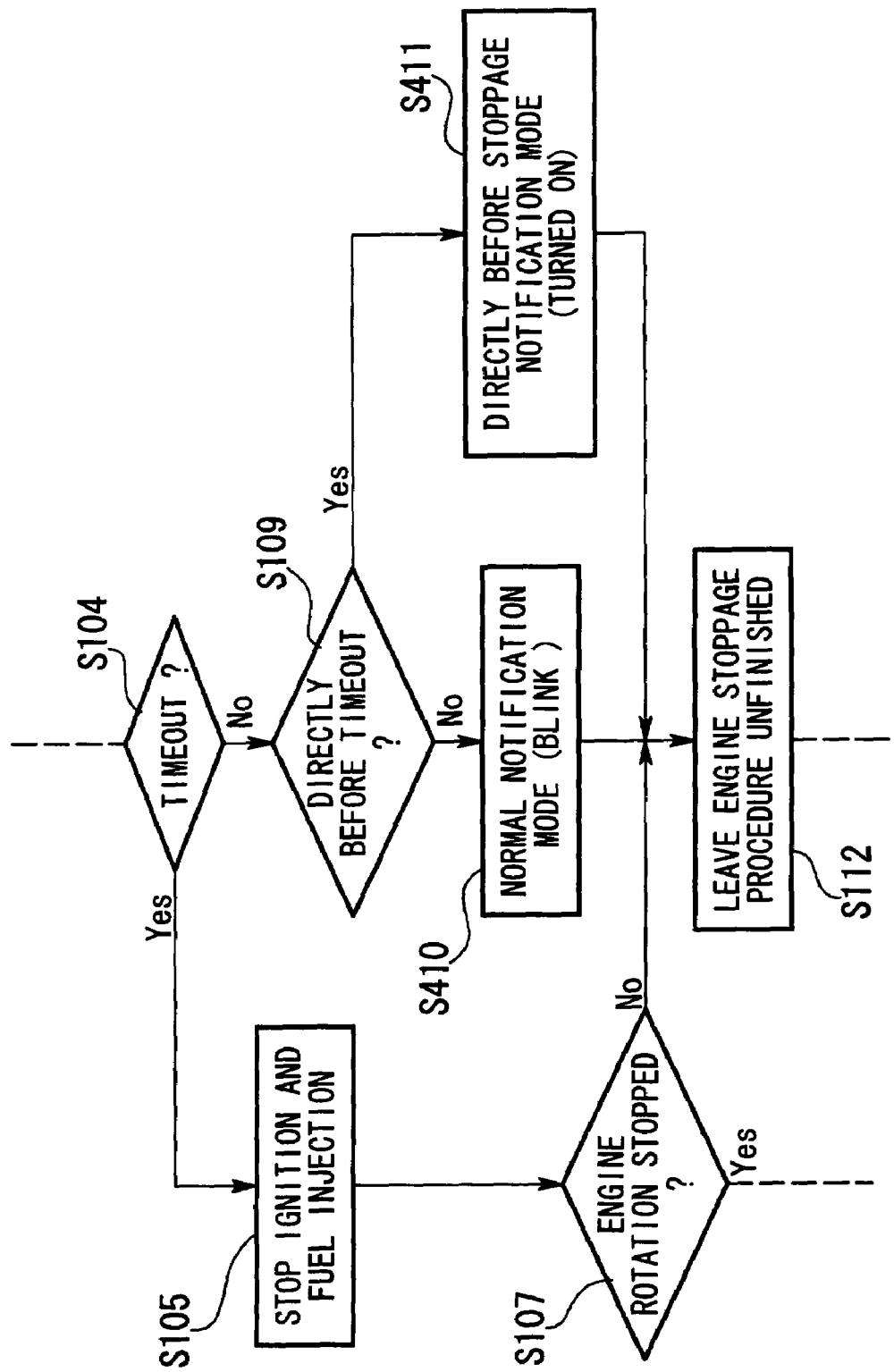
FIG. 7 is a flow chart of an engine stoppage procedure which is performed by an engine stoppage notification apparatus according to the second preferred embodiment of the present invention.

Next, a second preferred embodiment of the present invention will be explained based upon the flow chart of FIG. 7, and while referring to FIGS. 1 through 6. It should be understood that, in the description of this second preferred embodiment, only the parts and features which are different from those in the first preferred embodiment described above, which are concentrated in the flow charts of FIG. 3 and FIG. 6 which deal with the preferred notification embodiment, will be explained, and repetitive discussion will be omitted. Although these procedures also show the engine stoppage procedure, just as in the first preferred embodiment described previously, the procedures of steps S110 and S111 of the first preferred embodiment described previously have been replaced by novel steps S410 and S411, and step S106 is omitted. In the following, these will be explained in order.

First, in the same manner as in the first preferred embodiment, the procedures from step S100 to step S104 are performed. Next, in step S104, a decision is made as to whether or not the countdown has timed out. If the result of the decision in step S104 is NO (in other words, the countdown has not timed out), then the flow of control proceeds to step S109; while, if the result of this decision is YES (in other words, the countdown has timed out), then the flow of control proceeds to step S105.

In step S109, a decision is made as to whether or not the countdown is directly before timeout. If the result of the decision in step S109 is NO (in other words, the countdown is not directly before timeout), then the flow of control proceeds to step S410; while, if the result of this decision is YES (in other words, the countdown is directly before timeout), then the flow of control proceeds to step S411.

In step S410, the notification section 9 is set to the normal notification mode (for example, the blinking of the second preferred notification embodiment in FIG. 6), and the flow of control proceeds to step S112. Furthermore, in subsequent step S411, the notification section 9 is set to the notification mode before stoppage (for example, the illumination of the preferred notification embodiment in FIG. 6), and then the flow of control proceeds to step S112.

In step S105 the ignition and the fuel injection are stopped, and next in step S107 a decision is made as to whether or not the engine revolution has stopped. After this the engine restart procedure of the FIG. 5 flow chart is terminated, and the illumination of this light is maintained, until returning to the procedure of step S114 which sets the notification cancelled mode.

It should be understood that, as shown in the third preferred embodiment of FIG. 6, it would also be acceptable to substitute illumination for the normal notification mode of step S410, and blinking for the notification mode just before stoppage of step S411.

Accordingly, with this second preferred embodiment of the present invention, in particular, it becomes possible to notify the driver, via the notification section 9, of the fact that it is currently the interval from directly before the engine stoppage until the engine automatically restarts. Therefore, it is possible to enable the driver to recognize whether or not the engine has stopped abnormally, accordingly it is possible to alleviate the burden upon the driver.

It should be understood that the present invention is not to be considered as being limited to the above described preferred embodiments thereof; for example, it would also be acceptable to utilize it with a four wheeled vehicle upon which the engine is capable of automatic stoppage. Furthermore, it would also be acceptable to arrange for it to be possible to set any desired time period for setting the stoppage timer. Yet further, although the blinking display of the notification section 9 is shifted from "blinking 1" to "blinking 2" after five seconds from the time that the stoppage countdown started (in step S103), this is not to be considered as being limitative of the present invention; it would also be acceptable to select any appropriate time period for thus shifting over the blinking display.

Even further, the method of display by the notification section 9 is not to be considered as limited to being blinking; it would also be possible to utilize any a device which provided such a display in any suitable format, provided that it enabled the driver of the vehicle to become aware that the timeout of the stoppage timer is imminent. Moreover, although in the shown embodiments of the present invention a display device such as a lamp or the like is employed as the notification section 9, this is not to be considered as being limitative either; anything will be acceptable, provided that it enables the driver easily to become aware of the situation: for example, it would be acceptable to provide a notification via a liquid crystal display device, or via a LED, or aurally via a buzzer or the like.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An engine stoppage notification apparatus, fitted to a vehicle comprising an engine, which stops the engine when predetermined stoppage permission conditions are satisfied and starts the engine when predetermined restart permission conditions are satisfied, comprising:
   sensors which detect the operational state of the vehicle;
   a stop permission determination device which determines whether or not the engine stoppage is permitted, based upon the detection signal from the sensors;
   a measurement device which measures a predetermined time period for the engine stoppage from the time point at which the stop permission determination device has determined that the engine stoppage is permitted; and
   a notification device which issues a notification of the engine stoppage, while the measurement device is measuring the predetermined time period.

2. An engine stoppage notification apparatus according to claim 1, wherein, after the engine has stopped, restarting of the engine is prohibited while the predetermined time period is elapsing, irrespective of the presence or absence of the restart permission.

3. An engine stoppage notification apparatus according to claim 1, wherein the notification device is a display device which informs that the engine stoppage is imminent, from when the stoppage permission conditions are satisfied until the engine stops.

4. An engine stoppage notification apparatus according to claim 1, further comprising a stoppage cancellation device which, from when the stoppage permission conditions are satisfied until the engine stops, is capable of cancellation of the engine stoppage.

5. An engine stoppage notification apparatus according to claim 1, wherein
   the sensors includes a throttle position sensor and an intake air pressure sensor, and
   the notification apparatus combines the result which is detected by the intake air pressure sensor and the result which is detected by the throttle position sensor, and makes an accurate decision as to the presence or absence of accelerator actuation by a driver of the vehicle.

* * * * *